Figure 1:
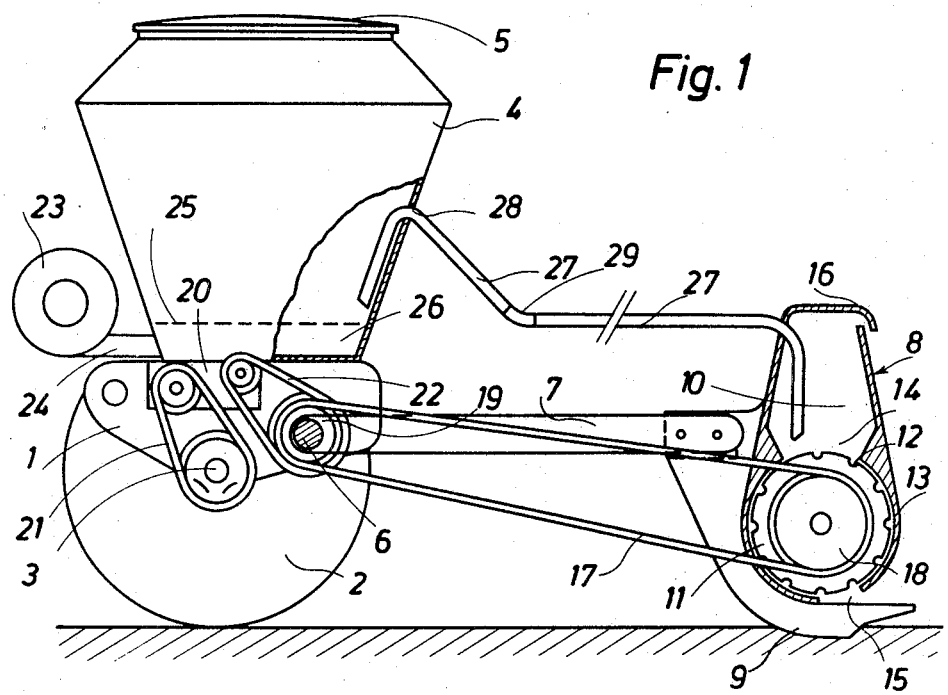

United States Patent

[11] 3,548,765

| [72] | Inventor | Xavier Roger Grataloup<br>Montereau, France |
|---|---|---|
| [21] | Appl. No. | 783,190 |
| [22] | Filed | Dec. 12, 1968 |
| [45] | Patented | Dec. 22, 1970 |
| [73] | Assignee | Societe Anonyme Noget-Gougis<br>Montereau, France<br>a corporation of France |
| [32] | Priority | Dec. 27, 1967 |
| [33] | | France |
| [31] | | No. 133949 |

[54] AGRICULTURAL DISTRIBUTING IMPLEMENT
5 Claims, 3 Drawing Figs.

[52] U.S. Cl. .............................................. 111/60,
111/178; 221/174, 221/185; 222/195
[51] Int. Cl. ............................................... A01c 7/18
[50] Field of Search ............................................... 111/77, 60,
78; 221/174, 185, 278; 222/193, 195

[56] References Cited
UNITED STATES PATENTS

| 1,637,834 | 8/1927 | Oliver | 221/211 |
| 1,641,735 | 9/1927 | Cheeseman | 222/195X |
| 2,874,878 | 2/1959 | Stokland | 111/77X |
| 2,968,266 | 1/1961 | Gustafson | 222/193X |
| 3,240,174 | 3/1966 | Jones | 111/77X |
| 3,386,629 | 6/1968 | Currie | 222/193 |
| 3,482,735 | 12/1969 | Goulter | 111/77X |

FOREIGN PATENTS

| 1,475,920 | 2/1967 | France | 222/195 |

Primary Examiner—Robert E. Pulfrey
Assistant Examiner—C. Coughenour
Attorney—Baldwin, Wight, Diller & Brown

ABSTRACT: According to the present invention an agricultural implement distributes measured quantities of seeds or fertilizer from a central closed hopper to a plurality of vented individual distributor assemblies each having an auxiliary reservoir. The seeds or fertilizer is conveyed pneumatically from the central hopper through pipes to the auxiliary reservoirs where accumulation is controlled by positioning the ends of the pipes.

Inventor:
Xavier Roger Grataloup
By Baldwin, Wight, Diller & Brown, Attorneys

AGRICULTURAL DISTRIBUTING IMPLEMENT

This invention relates to agricultural implements which distribute measured quantities of seeds or fertilizer, including so-called precision sowing machines.

So-called precision sowing machines are known, in which each sowing blade is fed by an individual seed distributor assembly secured to it, the object being to obtain accurate positioning of the seeds by making them fall directly from the distributor to the ground. To feed the distributor assemblies the seeds are placed in individual hoppers each secured to the respective distributor and feeding the latter direct by gravity.

The use of a hopper of this type with each distributor assembly and blade gives rise to various disadvantages, as follows:

1. The size of the hoppers prevents the close spacing of the blades which is necessary for certain crops.
2. The weight of the hoppers, and the variation in their load as sowing proceeds, make it more difficult to plant the seeds in a regular manner.
3. The distribution of the hopper weight over the width of apparatus entails a more expensive frame construction than if the hopper weight is concentrated in the middle.
4. The loading of the machine with seeds is laborious because of the large number of hoppers.
5. The cost of providing a number of hoppers is greater than the cost of providing a single large hopper.

It has also been proposed to feed pneumatically the blades of a sower, or the distributing assemblies of a fertilizer spreader, using tubes starting from a single hopper carried by the frame of the machine, optionally interposing a metering distributor at the bottom of the hopper. Nevertheless, even in this case the correct metering of the fertilizer, or the accuracy of the sowing, is by no means certain.

It is an object of the present invention to provide an agricultural implement of the type first specified, using pneumatic transport of the seeds or fertilizer from a common hopper, which will perform accurate distribution or metering.

According to the present invention, an agricultural implement which distributes measured quantities of seeds or fertilizer comprises a number of blades, each of which is fed by an individual distributor assembly which is secured to it and which in turn is fed by an auxiliary reservoir, the top of which is in communication with the atmosphere, while one end of a pipe runs into said reservoir to a predetermined depth, and the other end, after describing a bend containing a summit of said pipe, leads into a hopper which is common to all the blades and which can be tightly closed, said hopper being carried by the frame of the machine, and a blower for transporting the product to be distributed being connected to the base of said hopper.

By means of this arrangement, the material to be distributed, for example seeds, is conveyed pneumatically from the common hopper to each auxiliary reservoir until it reaches such a level therein that it closes the end of the pipe leading into said reservoir. The supply of the seeds (or other material) to said reservoir is then interrupted until the distributor assembly has itself taken out of the reservoir sufficient material to enable the level of the latter in said reservoir to fall until the end of the pipe is uncovered, whereupon the supply of material through said pipe can be resumed. A device with self-regulated feeding from a common hopper is thus provided, which is very economical in construction and which is free from the above-mentioned disadvantages of the previously known devices.

Figure 2:
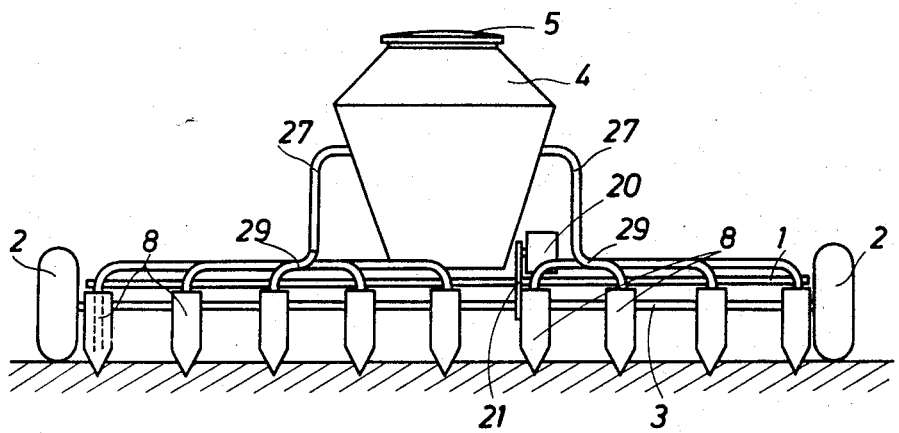
Figure 3:
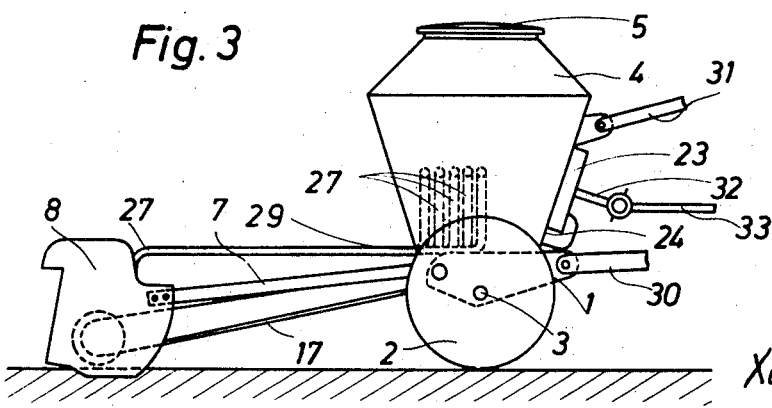

One embodiment of a precision sower according to the invention is illustrated in the accompanying drawings, in which:

FIG. 1 is a diagrammatical side elevation of the sower, partly in cross section, FIG. 2 is a rear elevation of the sower, on a smaller scale, and FIG. 3 is a side elevation, also on a smaller scale, the view being that from the opposite side to the side used in FIG. 1.

As shown in FIGS. 1—3, the sower comprises a frame 1 mounted on wheels 2 fixed on an axle 3. The frame 1 carries a seed hopper 4 provided with a tightly-fitting lid 5.

At the rear of the frame 2, a number of arms 7 (nine in the embodiment illustrated) pivot on a common transverse shaft 6 mounted rotatably in the frame, and each of said arms 7 carries at its free end a sowing assembly 8 (FIGS. 2 and 3) which comprises (FIG. 1) a blade 9 fixed at the end of the respective arm 7 and carrying a distributor; the distributor comprises a container 10 at the base of which is mounted a rotary distribution wheel 11 having on its periphery notches 12, each of which is adapted to receive a seed, said wheel 11 being enclosed in a casing 13 which (as shown at 14) is open at its top to communicate with the upper part of the container 10 and which at its bottom has an opening (as shown at 15) above the blade 9. A passage 16 gives the container 10 communication with the outside air.

The distribution wheel 11 of each sowing assembly 8 is rotated by the common shaft 6 by means of a belt 17 passing over a pulley 18 fixed on the shaft of the wheel 11 and also passing over a pulley 19 fixed on the common shaft 6. The shaft 6 in turn is rotated by the axle 3 of the frame 1 through the gearbox 20, the input shaft of which is connected to the axle 3 by a belt 21 and the output shaft of which is connected to the common shaft 6 by a belt 22.

A centrifugal fan 23 is connected to the bottom of the hopper 4 by a pipe 24 leading under a fine mesh grid 25 mounted a short distance above the bottom of the hopper 4. The grid 25 is fine enough to prevent the passage through it of the seeds contained in the hopper, and forms a chamber 26 at the bottom of the hopper. A number of pipes 27 (one for each sowing assembly 8), have their mouths above the grid 25, and each pipe 27 is curved to reach a summit 28 at the point at which it passes out of the hopper 4, its other end leading into the interior of the container 10 of the respective sowing assembly 8. Each pipe 27 has a flexible portion 29 to allow for the movement of the blade 9, which follows the irregularities of the ground. Means are provided (FIG. 3) to connect the frame 1 and the hopper 4 to the coupling bars 30 and 31 of a tractor, and to connect the drive shaft 32 of the fan 23 to the power takeoff 33 of said tractor.

The device operates in the following manner:

After the hopper 4 has been loaded and closed, and after the sower has been coupled to the tractor, as indicated above, the fan 23, which is driven by the power takeoff 33 of the tractor, applies air pressure to the chamber 26 at the bottom of the hopper 4, and also to the hopper 4 itself, the air passing through the grid 25. Assuming that the container 10 of each sowing assembly 8 is empty, the air flows through the pipes 27 to the container 10, carrying seeds from the hopper 4 with it, and escaping to the atmosphere through the passage 16. The distribution wheel 11 of each sowing assembly 8 is thus fed, and, when the sower advances, the wheel 11 is rotated by the transmission 17—22 and deposit seeds at regular intervals determined by the ratio selected in the gearbox 20.

Since the rate at which seeds can be delivered through each pipe 27 is greater, because of the design of the device, than the rate of delivery of seeds by the corresponding wheel 11, the container 10 becomes filled with seeds which, when their level rises sufficiently, will partially obstruct the end of the pipe 27. The supply of seeds through this pipe ceases when the speed of the air in the portion upstream of the summit 28 is no longer sufficient to lift the seeds to that summit. At that moment, however, the flow of air is still sufficient to convey to the container 10 the seeds which have passed beyond the summit 28, since the remainder of their path through the pipe is downhill or horizontal. The clogging of the pipes 27 is thus avoided.

As the distributor wheel 11 continues to carry seeds out of the container 10, the level of the seeds in the latter falls, thus freeing the end of the pipe 17 again and enabling the container 10 to be fed again, and so on.

It will be appreciated that numerous modifications may be made in the construction described above, without departing from the scope of the invention. It will also be appreciated that the same features can be utilized in the feeding system of a fertilizer spreader provided with a number of distributors for the application of metered quantities of fertilizer.

We claim:

1. A agricultural material distributing implement comprising a frame carried on at least two ground contacting wheels, towing connection means mounted on the frame, a plurality of ground contacting blades each pivotally mounted on the frame, an individual distributor carried by each blade and fed by an auxiliary reservoir mounted thereabove, the top of which is in communication with the atmosphere, a hopper and closure therefor carried by the frame, a blower carried by the frame and having its outlet connected to the base of said hopper, and a feed pipe to each auxiliary reservoir, each feed pipe having two ends, one of said ends running into the respective auxiliary reservoir to a predetermined depth and the other end leading into said hopper, and the path of each feed pipe between the respective auxiliary reservoir and said hopper describing a bend and containing a summit.

2. An implement as claimed in claim 1, wherein the ground contacting blades pivotally mounted on the frame are each disposed on the opposite side of the ground contacting wheels from the towing connection means.

3. An implement as claimed in claim 2, wherein the hopper is divided into an upper portion and a lower portion by a grid mounted at a higher level than the outlet of the blower.

4. An implement as claimed in claim 3, wherein each distributor comprises a peripherally notched wheel mounted for rotation about a substantially horizontal axis and driven from the ground contacting wheels of the implement.

5. An implement as claimed in claim 4, wherein the summit of each feed pipe is located at the outlet of the feed pipe from the hopper.